US012730920B2

(12) United States Patent
Quach et al.

(10) Patent No.: US 12,730,920 B2
(45) Date of Patent: Sep. 8, 2026

(54) RECEIVING REQUESTS FOR PERMISSION TO ACCESS DATA WITHIN A DATABASE SYSTEM

(71) Applicant: T-MOBILE INNOVATIONS LLC, Overland Park, KS (US)

(72) Inventors: Scott Tuan Quach, Lynnwood, WA (US); William Luke Barnes, Seattle, WA (US); Younes Lahrichi, Bellevue, WA (US); Farrah Young Lee, Bellevue, WA (US); Hailey Eloise Mandal, Issaquah, WA (US)

(73) Assignee: T-Mobile Innovations LLC, Overland Park, KS (US)

( * ) Notice: Subject to any disclaimer, the term of this patent is extended or adjusted under 35 U.S.C. 154(b) by 0 days.

(21) Appl. No.: 18/925,811

(22) Filed: Oct. 24, 2024

(65) Prior Publication Data

US 2026/0119689 A1 Apr. 30, 2026

(51) Int. Cl.
*G06F 21/00* (2013.01)
*G06F 21/62* (2013.01)

(52) U.S. Cl.
CPC ................................ *G06F 21/6218* (2013.01)

(58) Field of Classification Search
CPC ................................................... G06F 21/6218
See application file for complete search history.

(56) References Cited

U.S. PATENT DOCUMENTS 9,152,815 B2 * 10/2015 Baentsch ............ G06F 21/6218
9,269,100 B2 * 2/2016 Biesecker ........... G06F 16/9024
9,542,560 B2 * 1/2017 Garcia ................ G06F 21/6227
9,977,912 B1 * 5/2018 Kandamuthan ......... G06F 21/44
10,354,093 B1 * 7/2019 Farber ................ G06F 21/6218
11,941,139 B2 * 3/2024 Mika ................... G06F 21/6218
12,260,171 B1 * 3/2025 Fan ....................... G06F 16/254
12,380,315 B1 * 8/2025 Shobe .................... G06N 3/042
12,437,094 B2 * 10/2025 Warshavsky ........ G06F 21/6218
2004/0088560 A1 * 5/2004 Danks ..................... G06F 21/33
726/4
2009/0119772 A1 * 5/2009 Awad .................. G06F 21/6218
726/21
2010/0107213 A1 * 4/2010 Ureche ............... G06F 21/6218
726/1

(Continued)

*Primary Examiner* — Don G Zhao
(74) *Attorney, Agent, or Firm* — Shook, Hardy & Bacon L.L.P.

(57) ABSTRACT

Embodiments of the present disclosure are directed to systems and methods for receiving requests for permission to access data within a database system. This disclosure is meant to enable an end user to request access to different parts of a data model. The present disclosure provides a data visualization tool that represents data related to an organization by pulling in access state statuses for users associated with the organization and interweaves the user access state statuses with an interdependency graph. In some examples, the present disclosure generates a navigable interdependency graph based on data stored in a database, retrieves a number of access state statuses from a provisioning access service, maps the access state statuses to the navigable interdependency graph, and allows users to request permission to access datasets within the navigable interdependency graph.

20 Claims, 10 Drawing Sheets

(56) References Cited

U.S. PATENT DOCUMENTS

2016/0180107 A1* 6/2016 Panchbudhe ......... H04L 63/102
726/28
2018/0262510 A1* 9/2018 Su ....................... G06F 21/6218
2019/0361905 A1* 11/2019 Rogynskyy ............. G06F 16/23
2022/0179986 A1* 6/2022 Veeramachaneni ... G06F 3/0622
2022/0358233 A1* 11/2022 Thakur ................... G06F 21/31
2023/0208840 A1* 6/2023 Venable ................ H04L 63/102
726/1
2023/0353503 A1* 11/2023 Payment ............... H04L 47/781
2024/0037264 A1* 2/2024 Tran ...................... H04L 9/0643
2024/0097917 A1* 3/2024 Yan ........................... H04L 9/50
2024/0137382 A1* 4/2024 Shemesh ............. H04L 63/1416
2024/0232191 A9* 7/2024 Zhong ................. G06F 11/3409
2024/0265124 A1* 8/2024 Frattura .............. G06F 21/6218
2024/0362347 A1* 10/2024 Peukert ................. G06F 21/604
2025/0077899 A1* 3/2025 Sezgin ..................... G06N 5/02
2025/0085683 A1* 3/2025 Pelski .................. G05B 19/042
2025/0124150 A1* 4/2025 Sun ....................... G06F 21/604
2025/0148064 A1* 5/2025 Chen ................... G06F 21/6218
2025/0220017 A1* 7/2025 Litzenberger ....... G06F 16/9024
2025/0225264 A1* 7/2025 Khare ................... G06F 21/604
2025/0225370 A1* 7/2025 Choubey ................ G06N 3/045
2025/0238449 A1* 7/2025 Sharma ............. G06F 16/33295
2025/0307361 A1* 10/2025 Khare ................. G06F 21/6218

* cited by examiner

RECEIVING REQUESTS FOR PERMISSION TO ACCESS DATA WITHIN A DATABASE SYSTEM

SUMMARY

The present disclosure is directed to receiving requests for permission to access data within a database system, substantially as shown and/or described in connection with at least one of the Figures, and as set forth more completely in the claims.

According to various aspects of the technology, users may send requests for permission to access data within a database system. The present disclosure provides a data visualization tool (e.g., that represents data related to an organization) that pulls in access state statuses for users associated with the organization and interweaves the user access state statuses with an interdependency graph (e.g., a visual representation of data), allowing users to both view what parts of the interdependency graph that they have access to (e.g., the datasets they have access to) as well as how that access relates to other data in the interdependency graph. The present disclosure also grants users the ability to request permission to access to and/or manipulate different parts of the interdependency graph (e.g., access to different datasets of the data model). In other words, the present disclosure generates a navigable interdependency graph based on data stored in a database, retrieves a number of access state statuses from a provisioning access service, maps the access state statuses to the navigable interdependency graph, and allows users to request permission to access datasets within the navigable interdependency graph. Accordingly, the present solution allows users to request permission to data from a single location without the need to submit issue tickets or request permission from an external source (e.g., outside of the data visualization tool).

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter.

BRIEF DESCRIPTION OF THE DRAWINGS

Aspects of the present disclosure are described in detail herein with reference to the attached Figures, which are intended to be exemplary and non-limiting, wherein.

DETAILED DESCRIPTION

Figure 1:
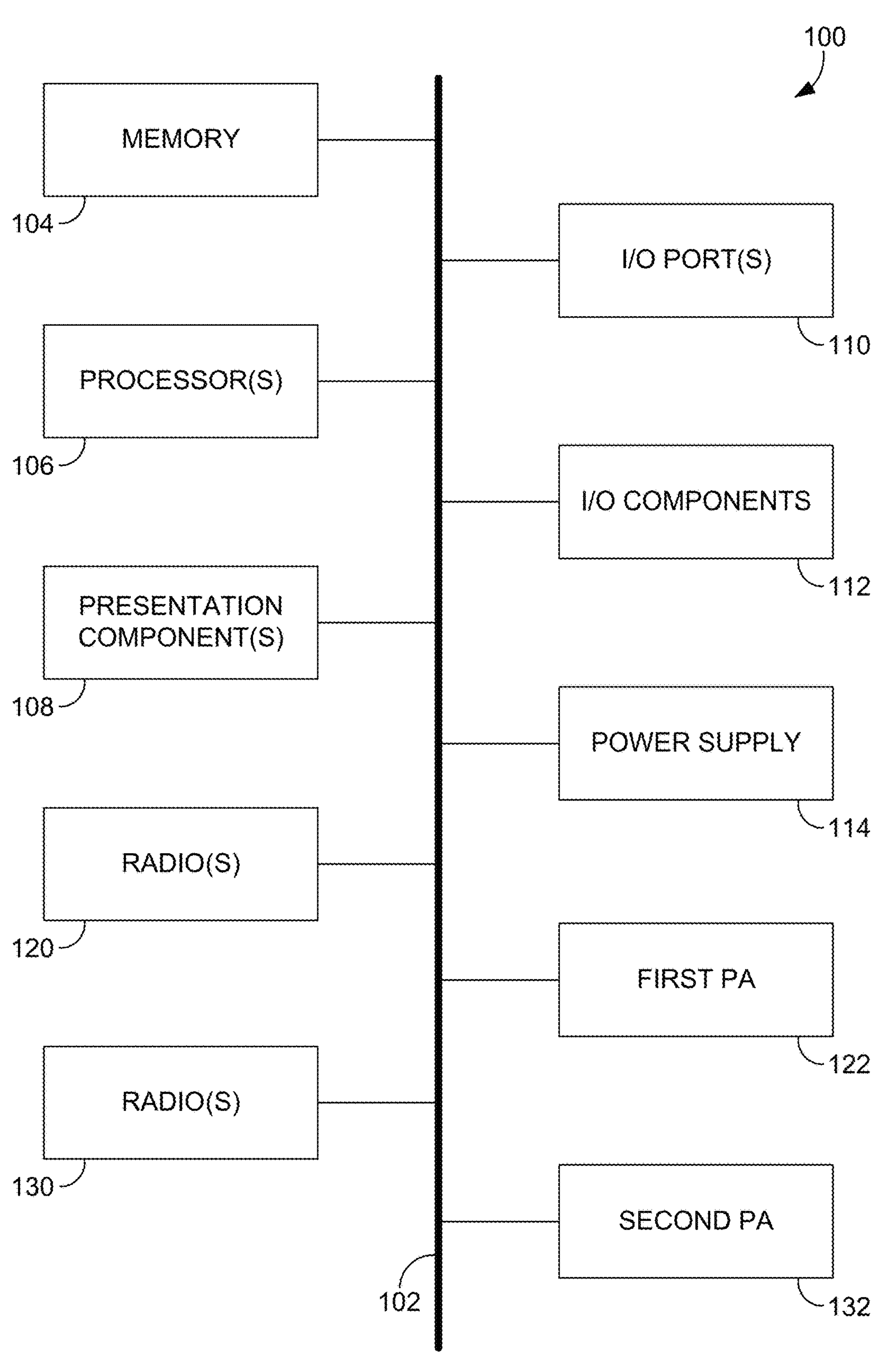
FIG. 1 illustrates a computing device for use with the present disclosure.

The subject matter of embodiments of the invention is described with specificity herein to meet statutory requirements. However, the description itself is not intended to limit the scope of this patent. Rather, the inventors have contemplated that the claimed subject matter might be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Various technical terms, acronyms, and shorthand notations are employed to describe, refer to, and/or aid the understanding of certain concepts pertaining to the present disclosure. Unless otherwise noted, said terms should be understood in the manner they would be used by one with ordinary skill in the telecommunication arts. An illustrative resource that defines these terms can be found in Newton's Telecom Dictionary, (e.g., 32d Edition, 2022). As used herein, the term "base station" refers to a centralized component or system of components that is configured to wirelessly communicate (receive and/or transmit signals) with a plurality of stations (i.e., wireless communication devices, also referred to herein as user equipment (UE(s))) in a particular geographic area. As used herein, the term "network access technology (NAT)" is synonymous with wireless communication protocol and is an umbrella term used to refer to the particular technological standard/protocol that governs the communication between a UE and a base station; examples of network access technologies include 3G, 4G, 5G, 6G, 802.11x, and the like. The term "mmWave" means RF waves having a wavelength measured in millimeters or fractions of millimeters (i.e., less than one cm), generally in the range of 30 GHz-3 THz, though frequencies above and below that range may still be used by aspects of the present disclosure.

Embodiments of the technology described herein may be embodied as, among other things, a method, system, or computer-program product. Accordingly, the embodiments may take the form of a hardware embodiment, or an embodiment combining software and hardware. An embodiment takes the form of a computer-program product that includes computer-useable instructions embodied on one or more computer-readable media that may cause one or more computer processing components to perform particular operations or functions.

Computer-readable media include both volatile and nonvolatile media, removable and nonremovable media, and contemplate media readable by a database, a switch, and various other network devices. Network switches, routers, and related components are conventional in nature, as are means of communicating with the same. By way of example, and not limitation, computer-readable media comprise computer-storage media and communications media.

Computer-storage media, or machine-readable media, include media implemented in any method or technology for storing information. Examples of stored information include computer-useable instructions, data structures, program modules, and other data representations. Computer-storage media include, but are not limited to RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These memory components can store data momentarily, temporarily, or permanently.

Communications media typically store computer-useable instructions—including data structures and program modules—in a modulated data signal. The term "modulated data signal" refers to a propagated signal that has one or more of its characteristics set or changed to encode information in the signal. Communications media include any information-delivery media. By way of example but not limitation, communications media include wired media, such as a wired network or direct-wired connection, and wireless media such as acoustic, infrared, radio, microwave, spread-spectrum, and other wireless media technologies. Combinations of the above are included within the scope of computer-readable media.

By way of background, regarding internal data models associated with a business, organization, or other entity, end users that query data within a data model often have difficulty understanding how to get access to restricted data. Furthermore, end users often do not know their access status regarding data in a data model. Having end users who do not know their access status regarding data in a data model tends to create extra overhead costs, because these end users frequently attempt to resolve any access status problems by submitting internal issue tickets. However, these issue tickets are usually related to simple access state confusion from the perspective of the end user. This confusion is further highlighted when end users need to access two different sources of data: (1) technical data (e.g., such as table metadata), and (2) request workflows (e.g., who has access to the technical data). As such, not only do end users need to access two different systems (e.g., technical data and request workflow systems), the terminology and verbiage used in each system differs between the two systems, which causes additional confusion amongst end users and results in even more issue tickets. In other words, regarding data models and access states, a lot of confusion amongst end users exists regarding where the end users are supposed to request permission to be granted access to certain metadata, and there is also confusion regarding how the user's access state correlates to the entire data model (e.g., all of the datasets and the interdependencies datasets).

Conventionally, end users would submit issue tickets for information technology (IT) workers to resolve the end user's issue regarding their access state. Conventional solutions for allowing users to see their access state statuses in data models often involve role-based access control (RBAC) dashboards (e.g., dashboards that display access levels based on user roles). While RBAC dashboards can be used to show access state statuses, data visualization tools can be used to create visual representations of data. For example, relationship diagrams, matrix charts, and tree diagrams can be used to visually represent data. Furthermore, these same data visualization tools can be used to visually represent which users have access to specific data, as well as metadata, and how these permissions (e.g., granted access to data) relate to other permissions within the data systems. However, these conventional solutions generally do not allow users without permission to directly request permission to data they do not have access to. For example, conventional data visualization tools do not have mechanisms in place to allow users utilizing the data visualization tools request permission to data in which they lack permission. As such, there is a need within data visualization tools for end users to be able to directly request permission to access certain data.

Unlike conventional solutions, the present disclosure is directed to allowing users to send requests for permission to access data within a database system. This disclosure is meant to enable an end user to request access to different parts of a data model. The present disclosure provides a data visualization tool (e.g., that represents data related to an organization) that pulls in access state statuses for users associated with the organization and interweaves the user access state statuses with an interdependency graph (e.g., a visual representation of data), allowing users to both view what parts of the interdependency graph that they have access to (e.g., the datasets they have access to) as well as how that access relates to other data in the interdependency graph. The present disclosure also grants users the ability to request permission to access to and/or manipulate different parts of the interdependency graph (e.g., access to different datasets of the data model). In other words, the present disclosure generates a navigable interdependency graph based on data stored in a database, retrieves a number of access state statuses from a provisioning access service, maps the access state statuses to the navigable interdependency graph, and allows users to request permission to access datasets within the navigable interdependency graph. Accordingly, the present solution allows users to request permission to data from a single location without the need to submit issue tickets or request permission from an external source (e.g., outside of the data visualization tool).

Accordingly, a first aspect of the present disclosure is directed to a system for receiving requests for permission to access data within a database system. The system comprises one or more computer processing components. The system further comprises a non-transitory computer readable media having instructions stored thereon that, when executed by the one or more computer processing components, cause the one or more computer processing components to perform operations comprising generating a navigable interdependency graph based on aggregated data stored in a database. The operations further comprise retrieving one or more access state statuses from a provisioning access service. The operations further comprise mapping the one or more access state statuses to the navigable interdependency graph. The operations further comprise receiving one or more requests for permission to access one or more datasets in the navigable interdependency graph.

A second aspect of the present disclosure is directed to a method for receiving requests for permission to access data within a database system. The method comprises generating a navigable interdependency graph based on aggregated data stored in a database. The method further comprises retrieving one or more access state statuses from a provisioning access service. The method further comprises mapping the one or more access state statuses to the navigable interdependency graph. The method further comprises receiving one or more requests for permission to access one or more datasets in the navigable interdependency graph.

Another aspect of the present disclosure is directed to a non-transitory computer readable media having instructions stored thereon that, when executed by one or more computer processing components, cause the one or more computer processing components to perform a method for receiving requests for permission to access data within a database system. The method comprises generating a navigable interdependency graph based on aggregated data stored in a database. The method further comprises retrieving one or more access state statuses from a provisioning access service. The method further comprises mapping the one or more access state statuses to the navigable interdependency graph. The method further comprises receiving one or more requests for permission to access one or more datasets in the navigable interdependency graph.

Referring to FIG. 1, an exemplary computer environment is shown and designated generally as computing device 100 that is suitable for use in implementations of the present disclosure. Computing device 100 is but one example of a suitable computing environment and is not intended to suggest any limitation as to the scope of use or functionality of the invention. Neither should computing device 100 be interpreted as having any dependency or requirement relating to any one or combination of components illustrated. In aspects, the computing device 100 is generally defined by its capability to transmit one or more signals to an access point and receive one or more signals from the access point (or some other access point); the computing device 100 may be referred to herein as a user equipment, wireless communication device, or user device. The computing device 100 may take many forms; non-limiting examples of the computing device 100 include a fixed wireless access device, cell phone, tablet, internet of things (IoT) device, smart appliance, automotive or aircraft component, pager, personal electronic device, wearable electronic device, activity tracker, desktop computer, laptop, PC, and the like.

The implementations of the present disclosure may be described in the general context of computer code or machine-useable instructions, including computer-executable instructions such as program components, being executed by a computer or other machine, such as a personal data assistant or other handheld device. Generally, program components, including routines, programs, objects, components, data structures, and the like, refer to code that performs particular tasks or implements particular abstract data types. Implementations of the present disclosure may be practiced in a variety of system configurations, including handheld devices, consumer electronics, general-purpose computers, specialty computing devices, etc. Implementations of the present disclosure may also be practiced in distributed computing environments where tasks are performed by remote-processing devices that are linked through a communications network.

With continued reference to FIG. 1, computing device 100 includes bus 102 that directly or indirectly couples the following devices: memory 104, one or more processors 106, one or more presentation components 108, input/output (I/O) ports 110, I/O components 112, and power supply 114. Bus 102 represents what may be one or more busses (such as an address bus, data bus, or combination thereof). Although the devices of FIG. 1 are shown with lines for the sake of clarity, in reality, delineating various components is not so clear, and metaphorically, the lines would more accurately be grey and fuzzy. For example, one may consider a presentation component such as a display device to be one of I/O components 112. Also, processors, such as one or more processors 106, have memory. The present disclosure hereof recognizes that such is the nature of the art, and reiterates that FIG. 1 is merely illustrative of an exemplary computing environment that can be used in connection with one or more implementations of the present disclosure. Distinction is not made between such categories as “workstation,” “server,” “laptop,” “handheld device,” etc., as all are contemplated within the scope of FIG. 1 and refer to “computer” or “computing device.”

Computing device 100 typically includes a variety of computer-readable media. Computer-readable media can be any available media that can be accessed by computing device 100 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data. Computer storage media includes RAM, ROM, EEPROM, flash memory or other memory technology, CD-ROM, digital versatile disks (DVD) or other optical disk storage, magnetic cassettes, magnetic tape, magnetic disk storage or other magnetic storage devices. Computer storage media of the computing device 100 may be in the form of a dedicated solid state memory or flash memory, such as a subscriber information module (SIM). Computer storage media does not comprise a propagated data signal.

Communication media typically embodies computer-readable instructions, data structures, program modules or other data in a modulated data signal such as a carrier wave or other transport mechanism and includes any information delivery media. The term “modulated data signal” means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 104 includes computer-storage media in the form of volatile and/or nonvolatile memory. Memory 104 may be removable, nonremovable, or a combination thereof. Exemplary memory includes solid-state memory, hard drives, optical-disc drives, etc. Computing device 100 includes one or more processors 106 that read data from various entities such as bus 102, memory 104 or I/O components 112. One or more presentation components 108 presents data indications to a person or other device. Exemplary one or more presentation components 108 include a display device, speaker, printing component, vibrating component, etc. I/O ports 110 allow computing device 100 to be logically coupled to other devices including I/O components 112, some of which may be built in computing device 100. Illustrative I/O components 112 include a microphone, joystick, game pad, satellite dish, scanner, printer, wireless device, etc.

A first radio 120 and a second radio 130 represent radios that facilitate communication with one or more wireless networks using one or more wireless links. In aspects, the first radio 120 utilizes a first transmitter 122 to communicate with a wireless network on a first wireless link and the second radio 130 utilizes the second transmitter 132 to communicate on a second wireless link. Though two radios are shown, it is expressly conceived that a computing device with a single radio (i.e., the first radio 120 or the second radio 130) could facilitate communication over one or more wireless links with one or more wireless networks via both the first transmitter 122 and the second transmitter 132. Illustrative wireless telecommunications technologies include CDMA, GPRS, TDMA, GSM, 802.11, and the like. One or both of the first radio 120 and the second radio 130 may carry wireless communication functions or operations using any number of desirable wireless communication protocols, including 802.11 (Wi-Fi), WiMAX, LTE, 3G, 4G, LTE, 5G, NR, VoLTE, or other VoIP communications. In aspects, the first radio 120 and the second radio 130 may be configured to communicate using the same protocol but in other aspects they may be configured to communicate using different protocols. In some embodiments, including those that both radios or both wireless links are configured for communicating using the same protocol, the first radio 120 and the second radio 130 may be configured to communicate on distinct frequencies or frequency bands (e.g., as part of a carrier aggregation scheme). As can be appreciated, in various embodiments, each of the first radio 120 and the second radio 130 can be configured to support multiple technologies and/or multiple frequencies; for example, the first radio 120 may be configured to communicate with a base station according to a cellular communication protocol (e.g., 4G, 5G, 6G, or the like), and the second radio 130 may configured to communicate with one or more other computing devices according to a local area communication protocol (e.g., IEEE 802.11 series, Bluetooth, NFC, z-wave, or the like).

Figure 2:
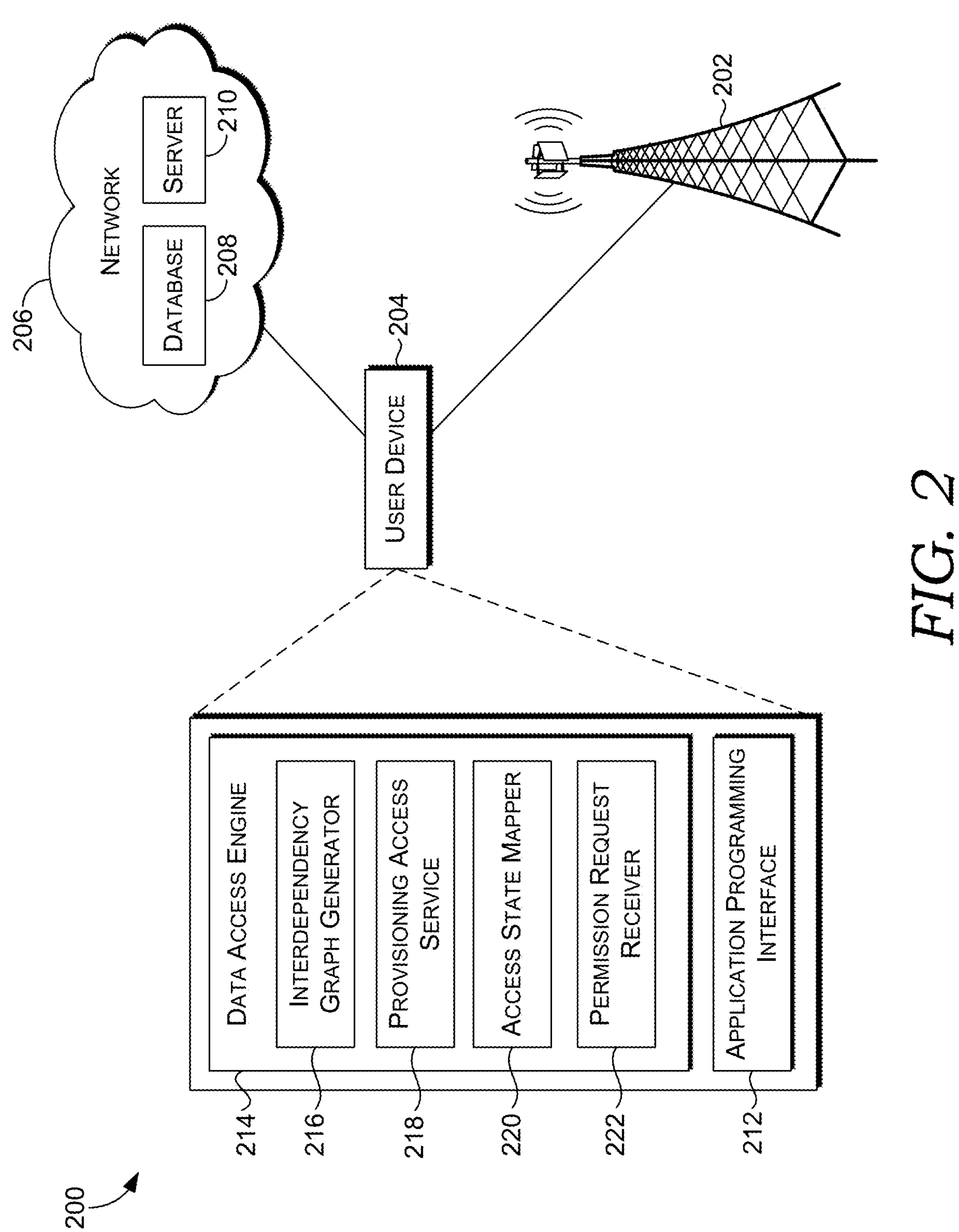
FIG. 2 illustrates a metadata access engine in which implementations of the present disclosure may be employed.

Turning now to FIG. 2, an exemplary network environment is illustrated in which implementations of the present disclosure may be employed. Such a network environment is illustrated and designated generally as network environment 200. At a high level, the network environment 200 comprises one or more UEs, one or more base stations, and one or more networks. Though a UE 204 is illustrated as a cellular phone, a UE suitable for implementations with the present disclosure may be any computing device having any one or more aspects described with respect to FIG. 1. Similarly, though base station 202 is illustrated as a macro cell on a cell tower, any scale or form of access point acting as a transceiver station for wirelessly communicating with a UE, including small cells, pico cells, Wi-Fi access points (e.g., routers or mesh networks), and the like, are suitable for use with the present disclosure.

The network environment 200 comprises one or more base stations with which a UE may wirelessly communicate. The base station 202 comprises hardware and software components that allow it to wirelessly communicate with one or more UEs in one or more coverage areas. Each coverage area may be logically defined in space and frequency as one or more cells, which may or may not overlap. Using any radio access technology selected by a mobile network operator (e.g., 4G, 5G, 6G, 802.11x, and the like), the base station may transmit and receive wireless signals using one or more antenna elements.

Each base station of the one or more base stations may be associated with one or more at least partially distinct networks, wherein each network is associated with one or more network identifiers. Each network, such as network 206, may be a telecommunications network(s) (e.g., a packet data network or core network), data network, or portions thereof. A telecommunications network that at least partially comprises the network environment 200 may include additional devices or components (e.g., one or more base stations) not shown. Those devices or components may form network environments similar to what is shown in FIG. 2, and may also perform methods in accordance with the present disclosure. Components such as terminals, links, and nodes (as well as other components) may provide connectivity in various implementations.

In order to receive requests for permission to access data within a database system, the network environment comprises a data access engine 214. Though illustrated as a dedicated engine within a network, the data access engine 214 is described herein by way of its functionality and may be deployed or implemented in various ways that are consistent with the functionality described herein. For example, the data access engine 214 may take the form of one or more computer processing components at or near the base station 202 executing computer executable instructions that cause the one or more computer processing components to perform the operations described herein. In some examples, the data access engine 214 may take the form of one or more computer processing components at or near a server 210 executing computer executable instructions that cause the one or more computer processing components to perform the operations described herein. The data access engine 214 may be said to interact with a database 208 and an application programming interface (API) 220, and the data access engine 214 may comprise an interdependency graph generator 216, a provisioning access service 218, an access state mapper 220, and a permission request receiver 222.

The interdependency graph generator 216 interfaces with data and/or metadata of the database 208. In some examples, the database 208 may be signal database or multiple databases. In some aspects, the database 208 is a data warehouse. In some embodiments, the database 208 is configured to manage data relating to an organization (e.g., company, corporation, institution, business, etc.). In some examples, the database 208 may be stored on the cloud or may be physically stored. For example, the database 208 may include on-chip storage and/or off-chip storage. The database 208 may include one or more storage elements including RAM, SRAM, DRAM, VRAM, Flash, hard disks, and/or other components and/or devices that may store at least one bit of data.

In some aspects, the interdependency graph generator 216 processes the data and/or metadata of the database 208 and utilizes the data and/or metadata to generate a navigable interdependency graph that showcases how the data and/or metadata relates to other data and/or metadata stored in the database 208. In some examples, the navigable interdependency graph is a data visualization tool. In some embodiments, a graphics processing unit (GPU) of the user device 204 and/or the API 212 is used by the interdependency graph generator 216 to process and render the navigable interdependency graph for display on a display device (e.g., such as the user device 204). In some aspects, the navigable interdependency graph is a visual representation that illustrates how different datasets (e.g., each dataset is associated with an entity or subgroup within an organization) stored in the database 208 relate on one another.

Figure 5A:
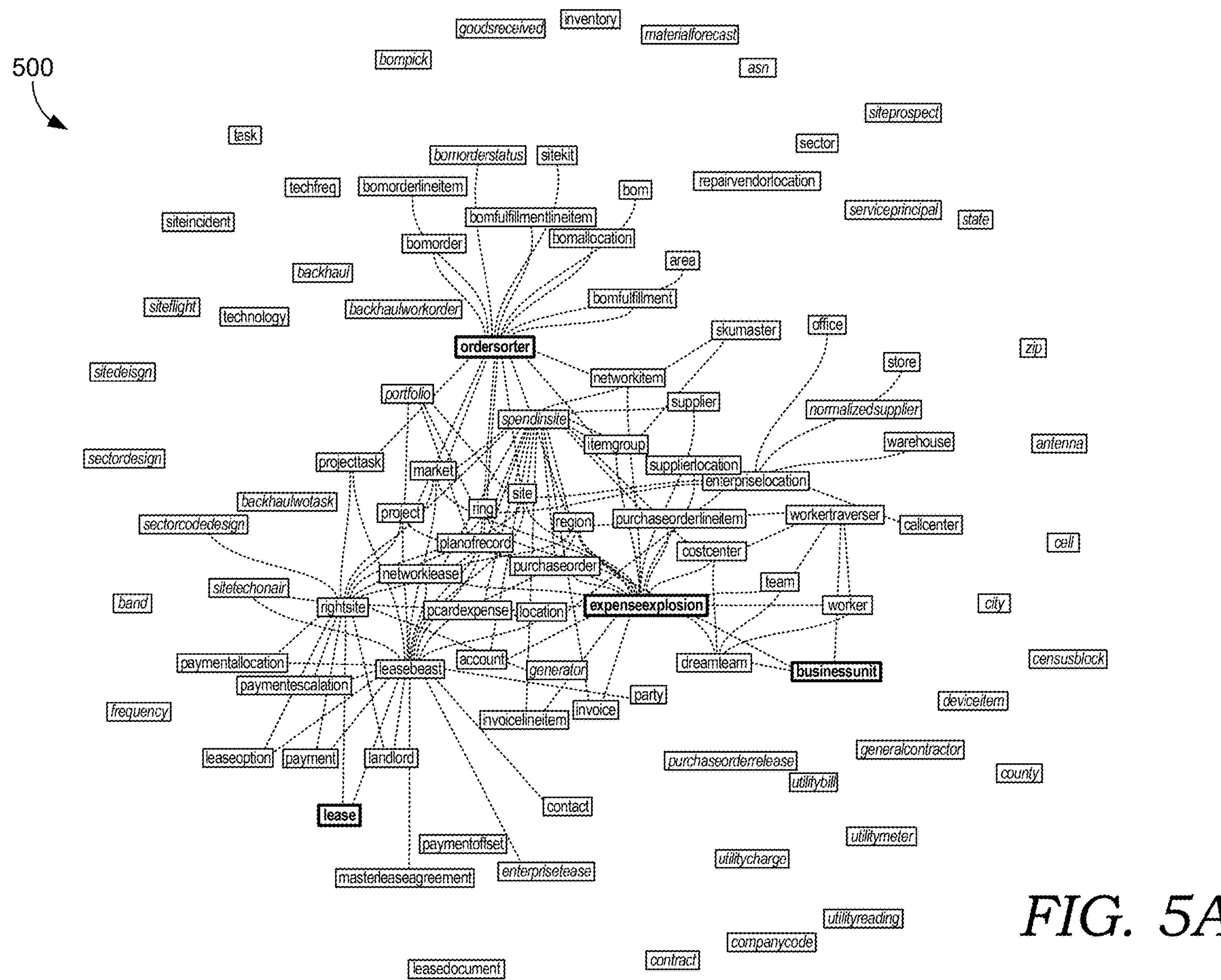
FIG. 5A illustrates an example navigable interdependency graph in which implementations of the present disclosure may be employed.

For example, briefly referring to FIG. 5A, FIG. 5A illustrates an example navigable interdependency graph 500. In this example, using nodes and dashed lines connecting the nodes to visually represent how the different datasets (e.g., entities and/or subgroups) are connected (e.g., related) or not connected, a navigable interdependency graph showcases the nature of dependencies amongst different datasets. In some embodiments, navigable interdependency graphs help users manage interdependent datasets. In some aspects, the navigable interdependency graph is structured as a Directed Acyclic Graph (DAGs). Unlike static graphs, the navigable interdependency graph provide dynamic features for users to query, zoom, and drill down into datasets associated with the navigable interdependency graph to understand the structure of and connections between datasets. In some examples, the navigable interdependency graph generated by the interdependency graph generator 216 is an interactive representation of datasets within the database 208 that allows users to explore and traverse the relationships and dependencies between the datasets (e.g., including entities, tasks, hierarchical relationships, and any other relationships that can exist between datasets within an organization) by clicking on the different nodes that represent the datasets. Unlike static graphs, navigable interdependency graphs provide dynamic features for querying, zooming, and drilling down into datasets to understand the structure of and connections between datasets. In some embodiments, the interdependency graph generator 216 generates a navigable interdependency graph based on the data and/or metadata stored in the database 208 by grouping the data/or metadata (e.g., based on the entity, task, hierarchical relationship, and any other relationship that can exist between datasets in the organization), extracting the relationships between the data and/or metadata, and forming the nodes and connections based on the groupings and relationships.

In some aspects, the data access engine 214 correlates the information associated with the navigable interdependency graph generated by the interdependency graph generator 216 with the provisioning access service 218. In some examples, the provisioning access service 218 is an access management system that contains the identifications of who within an organization has permission to access and/or manipulate the information (e.g., data and/or metadata) associated with the navigable interdependency graph. In some embodiments, the provisioning access service 218 retrieves permissions from the database 208. In some aspects, the provisioning access service 218 provisions access to read and write the data and/or metadata that is organized into the nodes (e.g., datasets) of the navigable interdependency graph. For example, as described below, a user can use the API 212 to select (e.g., click on) a node and see if the user has permission to access and/or manipulate data and/or metadata of the dataset associated with the node. In some examples, the interdependency graph generator 216 and the provisioning access service 218 may be two separate systems that the data access engine combines into one service.

In some embodiments, the access state mapper 220 maps the access state statuses retrieved from the provisioning access service 218 to the navigable interdependency graph. In some aspects, the access state statuses include whether a user has permission or does not have permission to read (e.g., access) and/or write (e.g., manipulate) data and/or metadata associated with each dataset. In some aspects, by mapping the access state statuses to the navigable interdependency graph, the access state mapper 220 combines the data and/or metadata associated with a dataset with each user that has permission to read and/or write to that particular dataset. As such, the access state mapper 220 may assign the users who have access to one or more datasets to each of the one or more datasets. By doing this, a user can not only see how the datasets relate to one other (e.g., within the interdependency graph), but the user can also see their access state status as it relates to particular datasets within the interdependency graph.

In order to combine the access state statuses to the navigable interdependency graph, in some examples, the data access engine 214 runs computation logic internally as part of the server 210. In some embodiments, the computation logic first consumes the data and/or metadata from the database 208 in order to build out the hierarchy tree (e.g., the interdependency graph generator 216 generating the navigable interdependency graph). Accordingly, in some aspects, the hierarchy tree (e.g., the navigable interdependency graph) is not inherently determined by the data and/or metadata, but rather there is a computational logic (e.g., the interdependency graph generator 216) that organizes the data and/or metadata into the hierarchy, inferring the hierarchy from the data and/or metadata. In some examples, based off of access state statuses, the provisioning access service 218 retrieves the access state statuses associated with each potential user within the organization, then the access state mapper 220 may apply the access state statuses to the navigable interdependency graph. In other words, the data access engine 214 transforms the data and/or metadata within the database 208 into more of a navigable native object (e.g., the navigable interdependency graph) to be displayed on a display device for a user to view.

In some examples, the permission request receiver 222 allows users who do not have access to a dataset within the interdependency graph to directly request permission to access the data and/or metadata associated with the dataset. Conventionally, a user's access state status has been kept separate from the data and/or metadata associated with the datasets and interdependencies among the datasets of a navigable interdependency graph. As such, the permission request receiver 222 of the data access engine 214 allows users to request permission to data and/or metadata from a single location (e.g., the navigable interdependency graph) without the need to submit issue tickets or request permission from an external source (e.g., outside of the navigable interdependency graph).

Figure 3:
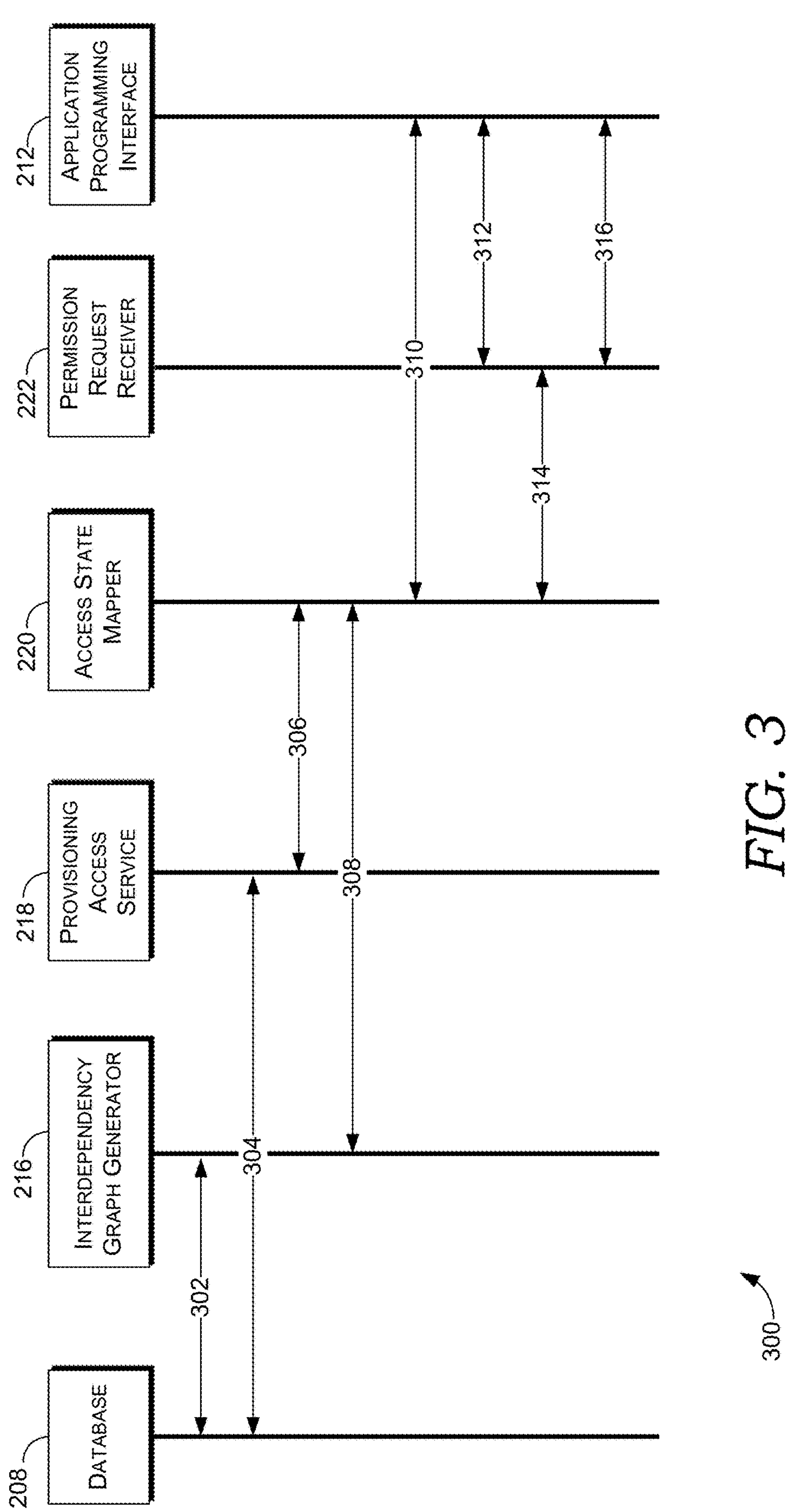
FIG. 3 illustrates an example call flow diagram in which implementations of the present disclosure may be employed.

Turning now to FIG. 3, an example of a call flow diagram 300 is illustrated in accordance with one or more aspects of the present disclosure. The example call flow diagram 300 may be said to exist between one or more components of the present disclosure to be discussed in greater detail herein and is not meant to exhaustively show every interaction that would be necessary to practice the invention, so as not to obscure the present disclosure, but is instead meant to illustrate one or more potential interactions between components of the present disclosure. In the example call flow diagram illustrated in FIG. 3, the call flow diagram includes the database 208, the interdependency graph generator 216, the provisioning access service 218, the access state mapper 220, the permission request receiver 222, and the API 212.

At step 302, the interdependency graph generator 216 processes the data and/or metadata stored within the database 208 and utilizes the data and/or metadata to generate a navigable interdependency graph. At step 304, the provisioning access service 218 retrieves access state statuses from the database 208. At step 306, the access state mapper 220 retrieves the access state statuses from the provisioning access service 218, and, at step 308, the access state mapper 220 maps the access state statuses for each user (e.g., within an organization) to the navigable interdependency graph generated by the interdependency graph generator 216. At step 310, the API 212 is used to facilitate the display of the navigable interdependency graph (e.g., via a GPU) on a display device (e.g., such as the user device 204). At step 312, a user who does not have access to a dataset within the navigable interdependency graph may directly request permission to access and/or to manipulate the data and/or metadata associated with the dataset via the permission request receiver 222. At step 314, if permission is granted (e.g., from an end user capable of granting permission to a user), the permission request receiver 222 notifies the access state mapper 220 to update the navigable interdependency map with the newly added permission (e.g., thereby allowing the user requesting permission to access and/or manipulate the dataset, depending on the type of permission request received). At step 316, a GPU of the API 212 (e.g., and/or the user device 204) is used to facilitate the display of the updated navigable interdependency graph, showing the newly granted permission on a display device. As such, a user's access state status may be presented on a graphical user interface (GUI) via the API 212.

Figure 4:
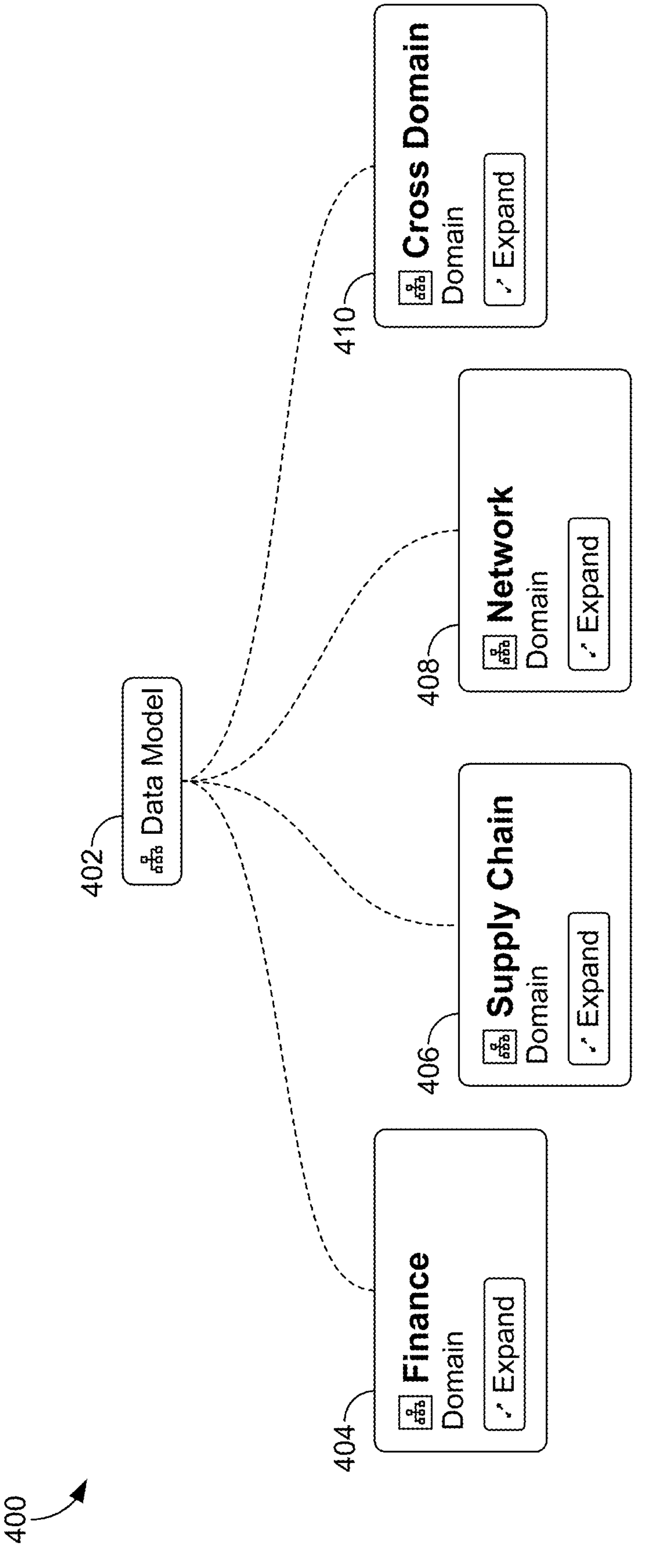
FIG. 4 illustrates an example displayed data model in which implementations of the present disclosure may be employed.

Turning now to FIG. 4, an example of a displayed data model 400 is illustrated in accordance with one or more aspects of the present disclosure. In some aspects, the displayed data model 400 is high-level overview of the navigable interdependency graph generated by the data access engine 214. In some examples, a GPU of the user device 204 and/or the API 212 is used by the data access engine 214 to render the navigable interdependency graph for display on a display device (e.g., such as the user device 204). As such, a user's access state status within the navigable interdependency graph may be presented on a GUI via the API 212. The example displayed data model 400 includes a data model 402 (e.g., a data warehouse, such as all of the data and/or metadata stored in the database 208), which comprises a number of different domains (e.g., a finance domain 404, a supply chain domain 406, a network domain 408, and a cross domain 410, for example).

In some embodiments, when the example displayed data model 400 is displayed on a display device, a user can interact with the data model 402 and or any of the domains associated with the data model 402. In some examples, while the data model 402 may contain all of the data in the database 208 in an organized format (e.g., all of the data organized in the navigable interdependency graph format), each domain (e.g., the finance domain 404, the supply chain domain 406, the network domain 408, and the cross domain 410) may represent certain sections (e.g., an accumulation of related datasets) within the data model 402. For example, each domain may represent a different team within an organization represented by the navigable dependency graph, each domain may contain one or more datasets that forms the domain, and each domain may have different stewards (e.g., end users with permission to approve requests from users seeking access to different datasets associated with the domain).

In some embodiments, a user may select (e.g., by clicking on) either the data model 402 and/or one of the domains to open the navigable interdependency graph. For example, if a user clicks on the data model 402, the navigable interdependency graph will populate, and if the user clicks on one of the domains, the navigable interdependency graph will populate with the datasets associated with that domain called out for the user to visually perceive which datasets in the navigable interdependency graph are associated with that domain. In some aspects, each domain may be color coordinated such that when the domains are expanded into the interdependency graph view (e.g., such as the example depicted in FIG. 5A), the datasets that are associated with each domain can still be identified by a user as being associated with that specific domain due to the color of the datasets matching the color of the domain in the high-level overview depicted in the example illustrated in FIG. 4. Furthermore, in some embodiments, when browsing the navigable interdependency graph, the datasets in which a user has permission to access and/or manipulate may be color coded such that the datasets in a certain color (e.g., green, for example) may showcase to a user that that user has permission to access and/or manipulate that dataset, while datasets in a different color (e.g., grey, for example) may showcase that the user does not have permission to access and/or manipulate that dataset. In some embodiments, when browsing the navigable interdependency graph, a user may see all of the datasets that make up the data model 402.

With reference now to FIG. 5A, FIG. 5A illustrates the example navigable interdependency graph 500 in which implementations of the present disclosure may be employed. In this example, using nodes and dashed lines connecting the nodes to visually represent how the different datasets (e.g., entities and/or subgroups within an organization) are connected (e.g., related) or not connected (e.g., not related), the example navigable interdependency graph 500 showcases the nature of dependencies amongst different datasets in the data model 402. In some examples, as new data and/or metadata of the organization represented in the data model 402 are on-boarded and uploaded to the database 208, the data access engine 214 may update the navigable interdependency graph to reflect the new data and/or new metadata and the relationships amongst the datasets—as well as a user's access state status as it related to the updated navigable interdependency graph—and the user may be able to visual how that new data and/or metadata fits into the navigable interdependency graph. For example, when a user clicks on one of the number of different domains (e.g., from the example depicted in FIG. 4), the navigable interdependency graph may open, and the user can view all of the different datasets related to that specific domain, the information associated with those datasets, and the user's access state status as it pertains to those datasets.

Figure 5B:
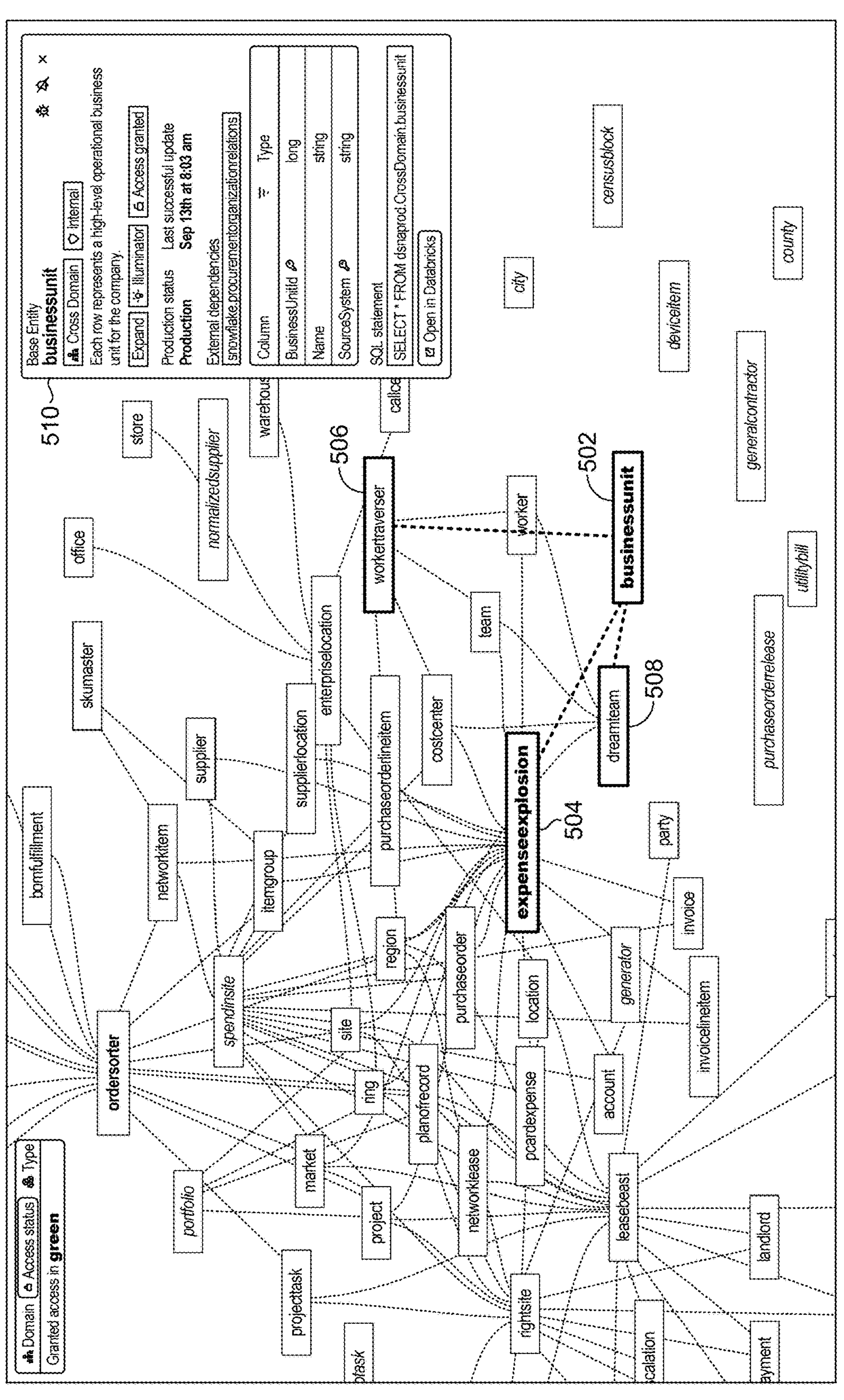
FIG. 5B illustrates the example navigable interdependency graph of FIG. 5A with a first selected dataset in which implementations of the present disclosure may be employed.

Referring now to FIG. 5B, FIG. 5B illustrates the example navigable interdependency graph of FIG. 5A with a first selected dataset in which implementations of the present disclosure may be employed. In this example navigable interdependency graph, a businessunit 502 dataset is selected (e.g., showcased by the bolded nodes and dashed connections in the example navigable interdependency graph). The businessunit 502 dataset is related to an expenseexplosion 504, a worktraverser 506, and a dreamteam 508 dataset. In some examples, when a user clicks on the businessunit 502 dataset, a dataset window (e.g., such as businessunit dataset window 510) may appear that contains information associated with that dataset. In some aspects, a user may select a dataset (e.g., such as the businessunit 502), see all of the data and/or metadata that is related to that specific dataset, and see the user's access state status (e.g., whether the user has permission to access and/or manipulate data and/or metadata associated with that specific dataset). In some examples, the datasets are similar to distinct teams within an organization's internal hierarchy. For example, the businessunit 502 dataset may be related to a business team within an organization while the expenseexplosion 504 dataset may be related to an accounting team. As can be seen in the example navigable interdependency graph, many datasets may be created by the data access engine 214 and may be represented in the navigable interdependency graph.

In some examples, a user of the present disclosure may obtain context regarding a dataset and information related to that dataset, including whether the user has permission to access and/or manipulate a dataset and its related datasets. For example, the businessunit 502 dataset, as well as all of the datasets related to the businessunit 502 dataset (e.g. the expenseexplosion 504, the worktraverser 506, and the dreamteam 508 datasets) may be highlighted in a color to showcase to a user that the datasets belong to a particular domain and that the user has permission to access these datasets.

In the example depicted in FIG. 5B, the businessunit 502 dataset is connected to the dreamteam 508 dataset. In some examples, prior to this disclosure, the context between the dreamteam 508 and the businessunit 502 datasets might not be available to a user, and the user's access state status as it relates to those datasets might also not be available to the user. Continuing the example, without the present disclosure, a user might need to have internal knowledge regarding the datasets (e.g. the dreamteam 508 and the businessunit 502 datasets) or might need to be a technical user to look up the relationships between the datasets (e.g., the context between the dreamteam 505 dataset and the businessunit 502 dataset) within the metadata of the data model 402 itself; otherwise, the user might have to submit a service ticket to gain access to the datasets and the relationships between the datasets. However, most users are not technical users, so users would generally have to request access to certain datasets in sort of a silo, not understanding how certain datasets relate to other datasets, not understanding the up-flow and down-flow streams associated with their request for access to a specific dataset (e.g., including how one dataset is related to another dataset, such as which dataset is higher in the hierarchy of datasets within the navigable interdependency graph). For example, in the example above, prior to this disclosure, a user might have been required to (e.g., depending on the user's needs) request access to the dreamteam 508 dataset instead of the businessunit 502 dataset, but the user might not know which dataset he requires access to, because the interdependencies between—and context associated with—the dreamteam 508 dataset and the businessunit 502 dataset might not be visualized to the user and might not be accessible to a non-technical user. In some aspects, the present disclosure visualizes these connections and access restrictions for a non-technical user and grants the user the ability to request permission access and/or manipulate the data and/or metadata of the data model 402 represented in the navigable interdependency graph.

Figure 5C:
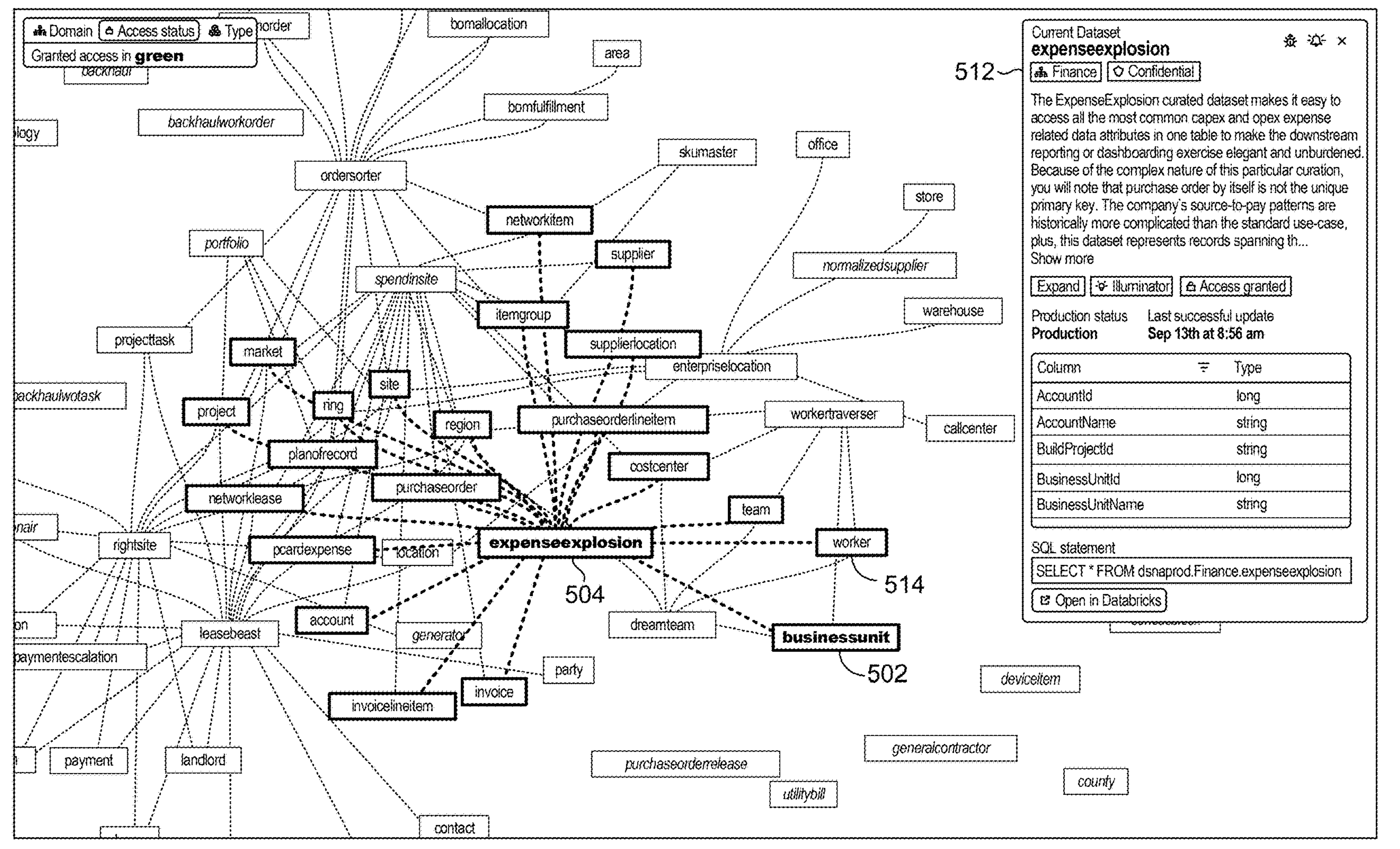
FIG. 5C illustrates the example navigable interdependency graph of FIG. 5A with a second selected dataset in which implementations of the present disclosure may be employed.

Turning now to FIG. 5C, FIG. 5C illustrates the example navigable interdependency graph of FIG. 5A with a second selected dataset in which implementations of the present disclosure may be employed. Prior to this disclosure, users who do not have permission to access and/or manipulate specific datasets and who request permission to access and/or manipulate these specific datasets might have found it difficult to understand how the specific datasets they are requesting access to fits into the broader picture of the hierarchy of an organization, including whether the user is requesting permission to access and/or manipulate the right dataset for that user's needs. For example, if a user requests permission access to the expenseexplosion 504 dataset to view data and/or matedata associated with the worker 514 dataset, the navigable interdependency graph of the present disclosure may help the user visualize that the user's request for permission follows principles of the least privileged (e.g., users may only request permission to datasets lower on the hierarchy before requesting permission to datasets higher within the hierarchy). In this example, instead of requesting access to the expenseexplosion 504 dataset, which might give the user access several other (e.g., non-relevant) pieces of information (e.g., information associated with the expenseexplosion 504 dataset and all of the datasets related to the expenseexplosion 504 dataset), the navigable interdependency graph of the present solution follows the principles of least privileged in the security context, meaning that the data access engine 214 (e.g., the permission request receiver 222 of the data access engine 214) may suggest to the user that the user might instead want to request access to the worker 514 dataset instead of the expenseexplosion 504 dataset, because while the worker 514 dataset may include less information (e.g., as compared to the expenseexplosion 504 dataset), the data that is included in the worker 514 dataset may be more relevant to the needs of that specific. In other words, the present disclosure may stop users from requesting permission to access and/or manipulate datasets that are associated with more data and/or metadata than that user requires. Instead, in some aspects, the present disclosure provides a visual to a user to help the user request permission to access and/or manipulate the precise dataset that is relevant to that user.

Figure 6:
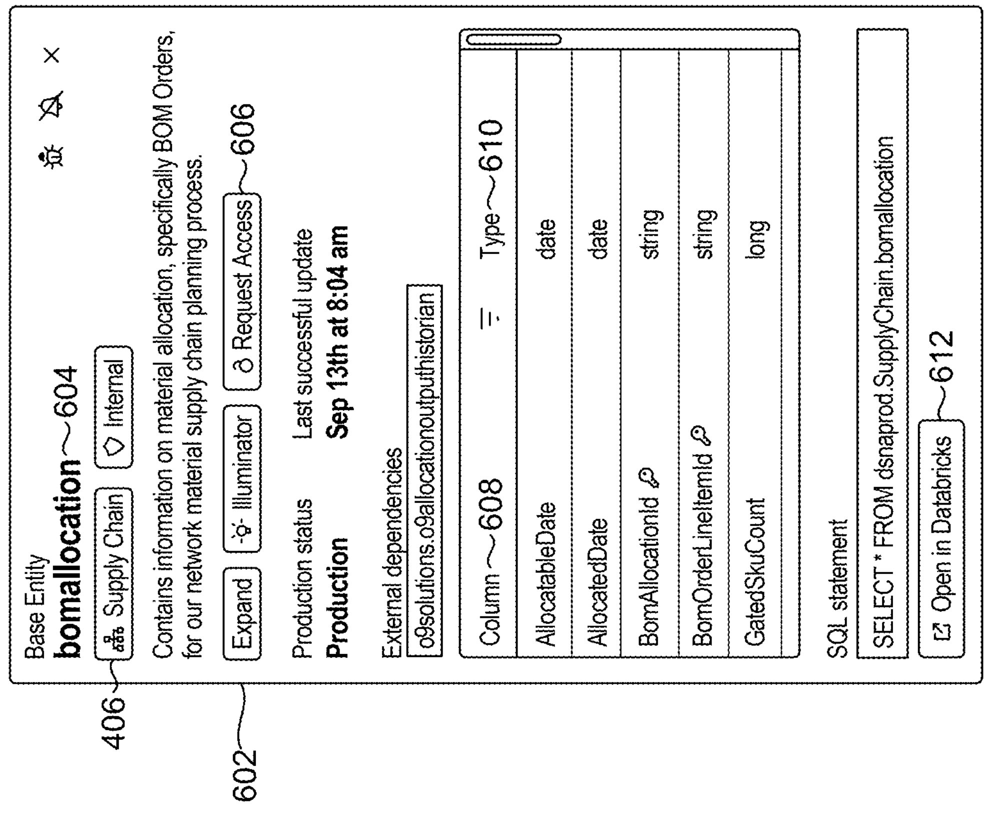
FIG. 6 illustrates an example dataset window in which implementations of the present disclosure may be employed.

Turning now to FIG. 6, an example dataset window 600 is provided in which implementations of the present disclosure may be employed. In some aspects, if the access state status for a user provides the user permission to access and/or manipulate the dataset, the user may select and review the data and/or metadata associated with that specific dataset with a dataset window 602, which contains information related to the selected dataset. For example, in the example dataset window 600, the user has selected a bomallocation 604 dataset from the navigable interdependency graph. In this example, the user may see that the bomallocation 604 dataset belongs to the supply chain 406 domain. Furthermore, in some examples, a column 608 may showcase names of the different data and/or metadata associated with the dataset (e.g., the bomallocation 604 dataset) and a type 610 of data and/or metadata associated with that dataset. In some embodiments, if a user with permission wanted to manipulate the bomallocation 604 dataset, the user could select a link that would allow the user to do so, such as a databricks 612 (e.g., a hyperlink).

In some examples, the databricks 612 may be include all of the information related to a dataset (e.g., such as the bomallocation 604 dataset). For example, by selecting the databricks 612, a user can directly access the data and/or metadata associated with the bomallocation 604 dataset. In some aspects, a user with the requisite permission (e.g., to access and/or manipulate the dataset) may query the bomallocation 604 dataset, and the databricks 612 may automatically populate all of the data and/or metadata related to the bomallocation 604 dataset as a sequel query. Here, in some examples, the user may query the data and/or metadata within the bomallocation 604 dataset. In some examples, if a user does not have permission to access and/or manipulate a dataset, the user may request access via interlink connections that allow the user to request permission to access and/or manipulate the dataset. In some examples, if the user does not have permission to access and/or manipulate a dataset (e.g., such as the bomallocation 604 dataset), and the user attempts to query the dataset through the databricks 612, because the user does not yet have permission to access and/or manipulate that dataset. In other words, an error message may appear from the perspective of the user, because the user does not have permission to read or write to the selected dataset. In the example illustrated in FIG. 6, a user without permission to access and/or manipulate the bomallocation 604 dataset may select a request access 606 interlink, which may populate another window to allow the user to request permission to access and/or manipulate the dataset. As such, with the present disclosure, in some examples, a user can see all of the context associated with a dataset, including where the data pushes to, any related data and/or metadata, whether the user has access to the dataset, and how the user can gain access to the dataset.

Figure 7:
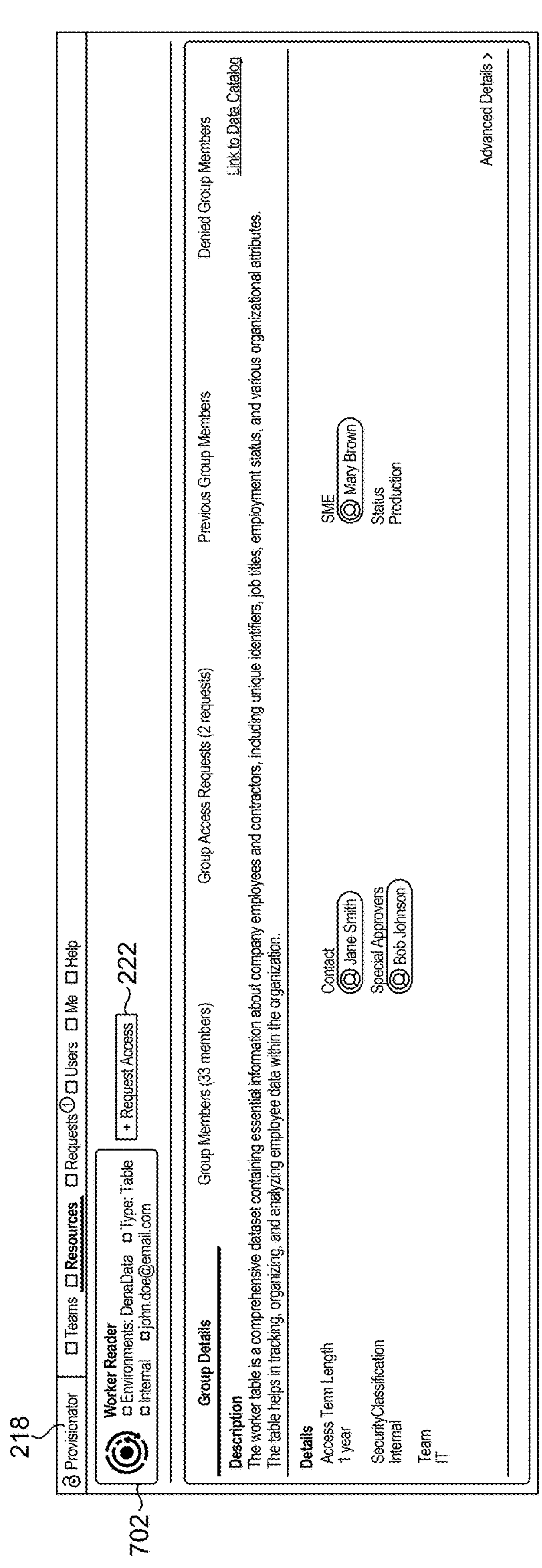
FIG. 7 illustrates an example worker reader window in which implementations of the present disclosure may be employed.

Turning now to FIG. 7, FIG. 7 illustrates an example worker reader window 700 in which implementations of the present disclosure may be employed. In some aspects, by selecting the request access 606 interlink, a user may be directed to a worker reader window 702 (e.g., displayed on the display of a display device) that is directly correlated with the provisioning access service 218 (e.g., depicted as a "provisionator") and the permission request receiver 222 (e.g., depicted as a "+Request Access"). In some examples, the worker reader window 702 may allow a user to request permission to access and/or manipulate a dataset by selecting the "+Request Access" link, where the user can specify which dataset the user wants to request permission to access and/or manipulate, as well as the type of permission (e.g., read, write, or read and write). In some embodiments, when a user requests permission to access and/or manipulate a dataset, the permission request receiver 222 receives the user's request and sends the request to an end user with permission to approve or deny the request.

In some aspects, if an end user approves a user's request, the changed access state status will be stored in the database 208, and the provisioning access service 218 will update the user's access state status, prompting the access state mapper 220 to update the navigable interdependency graph with the user's newly granted permission. When this happens, depending on the granted permission, the user my access and/or manipulate the dataset in which the user was granted permission. In other words, the user's access state status changes from a denied user access state status to a granted user access state status. As such, a user's user access status may be changed to a granted user access status when the user's request for permission is approved. In some example, if an end user denies a user's permission request, the user may receive a notification that the user's request was denied, and the navigable interdependency graph will not be updated.

Figure 8:
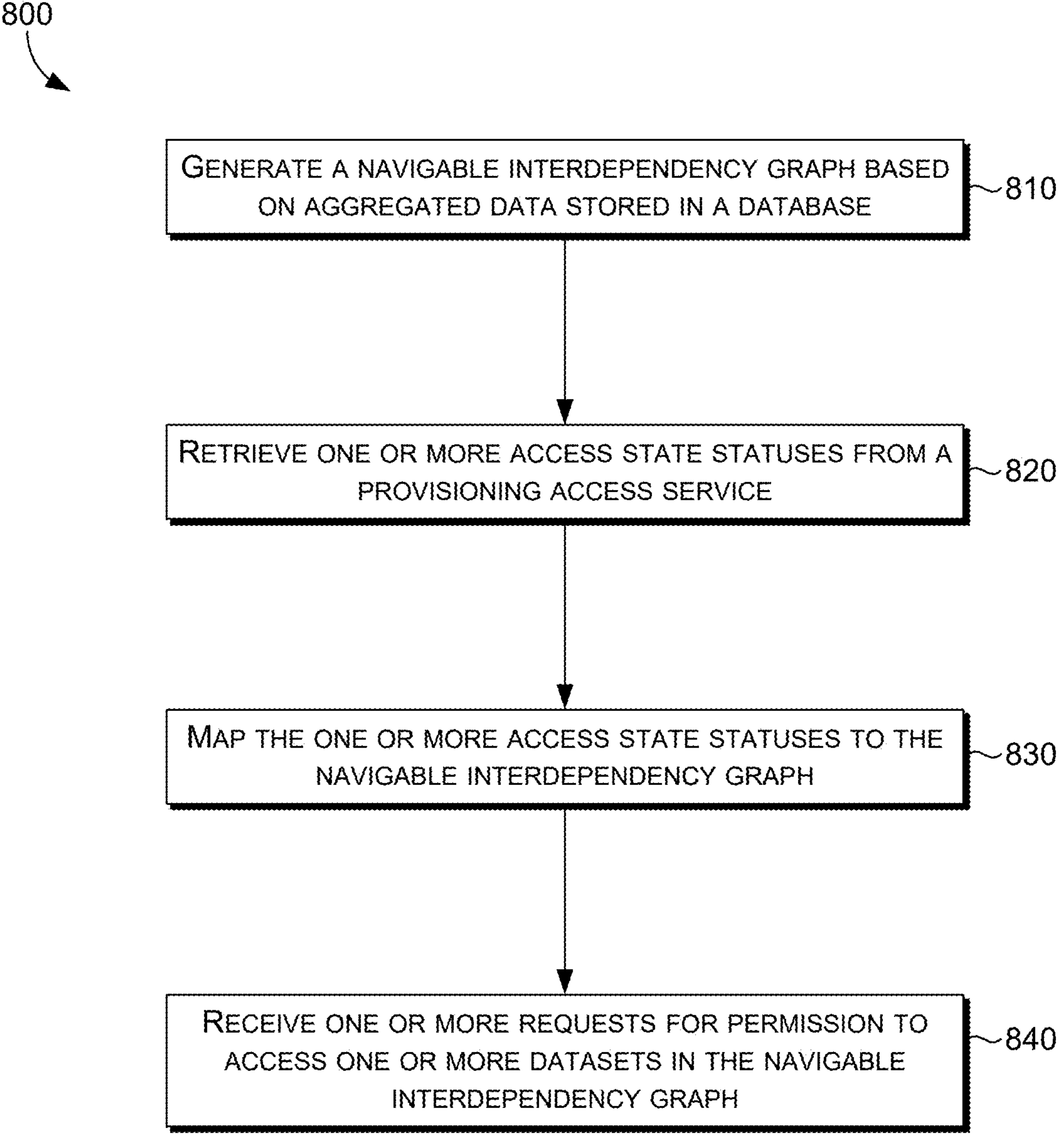
FIG. 8 depicts a flow diagram of a method in accordance with embodiments described herein.

Turning now to FIG. 8, a flow chart representing a method 480 is provided. Generally the method 800 may be used by a server, such as the server 210 FIG. 2, to receive requests for permission to access data within a database system. At a first step 810, the server generates a navigable interdependency graph based on the aggregated data stored in the database, according to any one or more aspects described with respect to FIGS. 2-5C. At a second step 820, the server retrieves one or more access state statuses from a provisioning access service, according to any one or more aspects described with respect to FIGS. 2, 3, 6, and 7. At a third step 830, the server maps the one or more access state statuses to the navigable interdependency graph, according to any one or more aspects described with respect to FIGS. 2-5C and 7. At a fourth step 840, the server receives one or more requests for permission to access one or more datasets in the navigable interdependency graph, according to any one or more aspects described with respect to FIGS. 2-3 and 6-7.

Many different arrangements of the various components depicted, as well as components not shown, are possible without departing from the scope of the claims below. Embodiments in this disclosure are described with the intent to be illustrative rather than restrictive. Alternative embodiments will become apparent to readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims In the preceding detailed description, reference is made to the accompanying drawings which form a part hereof wherein like numerals designate like parts throughout, and in which is shown, by way of illustration, embodiments that may be practiced. It is to be understood that other embodiments may be utilized and structural or logical changes may be made without departing from the scope of the present disclosure. Therefore, the preceding detailed description is not to be taken in the limiting sense, and the scope of embodiments is defined by the appended claims and their equivalents.

What is claimed is:

1. A system for receiving requests for permission to access data within a database, the system comprising:

one or more computer processing components; and a non-transitory computer readable media having instructions stored thereon that, when executed by the one or more computer processing components, cause the one or more computer processing components to perform operations comprising:

generating a navigable interdependency graph based on aggregated data stored in the database;

retrieving one or more access state statuses from a provisioning access service, wherein the provisioning access service retrieves the one or more access state statuses from the database;

mapping the one or more access state statuses to the navigable interdependency graph;

displaying a portion of the navigable interdependency graph on a display device enabling a user lacking access to a dataset in the database to directly submit a permission request for that dataset from within the navigable interdependency graph, wherein the displayed navigable interdependency graph is a visual representation that illustrates the relationship between each of one or more datasets within an entity or subgroup and other datasets of the one or more datasets; and receiving one or more requests for permission to access one or more datasets in the navigable interdependency graph from within the navigable interdependency graph.

2. The system of claim 1, wherein the database is a data warehouse.

3. The system of claim 1, wherein generating the navigable interdependency graph is based on determining a hierarchy tree, wherein determining the hierarchy tree is based on the aggregated data in the database.

4. The system of claim 3, wherein the hierarchy tree is determined by a computational logic, wherein the computational logic infers the hierarchy tree from the aggregated data.

5. The system of claim 1, wherein the navigable interdependency graph comprises one or more domains, wherein each of the one or more domains comprises the one or more datasets.

6. The system of claim 5, wherein the provisioning access service comprises the one or more access state statuses, wherein the one or more access state statuses comprises an identification of a plurality of users who have access to the one or more datasets.

7. The system of claim 6, wherein mapping the one or more access state statuses to the navigable interdependency graph comprises assigning the plurality of users who have access to the one or more datasets to each of the one or more datasets.

8. The system of claim 7, wherein the one or more access state statuses comprises either (1) a granted user access state status to one of the one or more datasets or (2) a denied user access state status to one of the one or more datasets.

9. The system of claim 8, wherein receiving the one or more requests for permission to access the one or more datasets further comprises:

determining an access state status of each user of the plurality of users; and presenting the access state status of a user from the plurality of users on a graphical user interface (GUI) via an application programming interface (API), wherein the access state status of the user is the denied user access state status.

10. The system of claim 9, wherein the denied user access state status is changed to the granted user access state status when the one or more requests for permission to access the one or more datasets is approved.

11. A method for receiving requests for permission to access data within a database system, the method comprising:

generating a navigable interdependency graph based on aggregated data stored in a database;

retrieving one or more access state statuses from a provisioning access service, wherein the provisioning access service retrieves the one or more access state statuses from the database;

mapping the one or more access state statuses to the navigable interdependency graph;

displaying a portion of the navigable interdependency graph on a display device enabling a user lacking access to a dataset in the database to directly submit a permission request for that dataset from within the navigable interdependency graph, wherein the displayed navigable interdependency graph is a visual representation that illustrates the relationship between each of one or more datasets within an entity or subgroup and other datasets of the one or more datasets; and receiving one or more requests for permission to access one or more datasets in the navigable interdependency graph from within the navigable interdependency graph.

12. The method of claim 11, wherein generating the navigable interdependency graph is based on determining a hierarchy tree, wherein determining the hierarchy tree is based on the aggregated data in the database.

13. The method of claim 12, wherein the hierarchy tree is determined by a computational logic, wherein the computational logic infers the hierarchy tree from the aggregated data.

14. The method of claim 11, wherein the navigable interdependency graph comprises one or more domains, wherein each of the one or more domains comprises the one or more datasets.

15. The method of claim 14, wherein the provisioning access service comprises the one or more access state statuses, wherein the one or more access state statuses comprises an identification of a plurality of users who have access to the one or more datasets.

16. The method of claim 15, wherein mapping the one or more access state statuses to the navigable interdependency graph comprises assigning the plurality of users who have access to the one or more datasets to each of the one or more datasets.

17. The method of claim 16, wherein the one or more access state statuses comprises either (1) a granted user access state status to one of the one or more datasets or (2) a denied user access state status to one of the one or more datasets.

18. The method of claim 17, wherein receiving the one or more requests for permission to access the one or more datasets further comprises:

determining an access state status of each user of the plurality of users; and presenting the access state of a user from the plurality of users on a graphical user interface (GUI) via an application programming interface (API), wherein the access state status of the user is a denied user access state status.

19. The method of claim 18, wherein the denied user access state status is changed to the granted user access state status when the one or more requests for permission to access the one or more datasets is approved.

20. A non-transitory computer readable media having instructions stored thereon that, when executed by one or more computer processing components, cause the one or more computer processing components to perform a method for receiving requests for permission to access data within a database system, the method comprising:

generating a navigable interdependency graph based on aggregated data stored in a database;

retrieving one or more access state statuses from a provisioning access service, wherein the provisioning access service retrieves the one or more access state statuses from the database;

mapping the one or more access state statuses to the navigable interdependency graph;

displaying a portion of the navigable interdependency graph on a display device enabling a user lacking access to a dataset in the database to directly submit a permission request for that dataset from within the navigable interdependency graph, wherein the displayed navigable interdependency graph is a visual representation that illustrates the relationship between each of one or more datasets within an entity or subgroup and other datasets of the one or more datasets; and receiving one or more requests for permission to access one or more datasets in the navigable interdependency graph from within the navigable interdependency graph.

* * * * *